United States Patent
Dorn

[15] 3,655,101
[45] Apr. 11, 1972

[54] PLUNGER ASSEMBLY FOR HAND GREASE GUNS

[72] Inventor: Chester Dorn, Spencer, Iowa
[73] Assignee: Superior Manufacturing Company, Spencer, Iowa
[22] Filed: May 15, 1970
[21] Appl. No.: 37,831

Related U.S. Application Data

[63] Continuation-in-part of Ser. No. 860,698, Sept. 24, 1969, abandoned.

[52] U.S. Cl. ........................................................222/326
[51] Int. Cl. ........................................................G01f 11/00
[58] Field of Search .....................222/326, 327, 386, 256; 277/212 FB, 212 C, 205

[56] References Cited

UNITED STATES PATENTS

| | | | |
|---|---|---|---|
| 2,985,495 | 5/1961 | Neuman | 222/326 X |
| 3,059,819 | 10/1962 | Sundholm | 222/256 X |
| 2,886,215 | 5/1959 | Klein et al. | 222/326 X |
| 3,038,768 | 6/1962 | Kludt | 277/212 |
| 2,867,457 | 1/1959 | Riesing et al. | 277/205 X |
| 2,600,516 | 6/1952 | Pielop, Jr. | 277/212 |

*Primary Examiner*—Stanley H. Tollberg
*Assistant Examiner*—Norman L. Stack, Jr.
*Attorney*—Henderson & Strom

[57] ABSTRACT

A plunger assembly is provided for slidable engagement with the plunger rod in hand grease guns, which grease guns are adapted to use both cartridge-packed grease and bulk-loaded grease. The plunger, in cross section, is of essentially W-shaped configuration and comprises a sleeve having a bore formed therethrough for slidably receiving the rod. A transverse web is carried by the forward portion of the sleeve and extends radially outwardly and, at its periphery, is attached to an interior support section which extends outwardly and rearwardly of the web to proximate the inside diameter of the grease barrel. An annular flexing and sealing wall is carried by the periphery of the support section and extends outwardly to beyond the inner diameter of the grease barrel and then forwardly and inwardly to a position forward of the sleeve and inward of the inner diameter of a grease cartridge. An annular lip is formed on the inner side of the wall and engages washer means between the lip and the forward portions of the transverse web.

11 Claims, 7 Drawing Figures

Patented April 11, 1972

INVENTOR
CHESTER DORN

BY Henderson & Strom

ATTORNEYS

Patented April 11, 1972

INVENTOR
CHESTER DORN
BY
Henderson F. Shoun
ATTORNEYS

PLUNGER ASSEMBLY FOR HAND GREASE GUNS

CROSS REFERENCE TO RELATED APPLICATION

This application is a continuation-in-part of the copending application of Chester Dorn, entitled Plunger Assembly for Hand Grease Guns, Ser. No. 860,698, filed Sept. 24, 1969 now abandoned.

BACKGROUND OF THE INVENTION

This invention relates to a plunger assembly adapted for use in grease guns utilizing both cartridge-packed grease and bulk-loaded grease.

A continuing effort has been made to develop a universal hand grease gun which performs satisfactorily with all methods of loading including cartridge loading and bulk loading. Bulk loading includes pressure loading, suction filling, and hand packing.

The most important, single element of a hand grease gun, to render the grease gun truly universal, is the plunger assembly. The plunger assembly must be adapted for use with a range of diameters while maintaining good sealing engagement, for example, at the diameter of the inside of the grease barrel and at the lesser diameter of the inside of a grease cartridge. Additionally, the plunger assembly should readily pass from the rearward portion of the grease barrel into the lesser diameter of the grease cartridge without need for modifying the grease barrel.

Attempts to perfect a plunger assembly are set forth in the following patents: Schlosser, U.S. Pat. No. 3,391,646; Sundholm, U.S. Pat. No. 3,286,887; Morehouse, U.S. Pat. No. 3,187,959; Sundholm, U.S. Pat. No. 3,059,819; Kludt, U.S. Pat. No. 3,038,768; and Whitten, U.S. Pat. No. 2,844,291. Of these patents, only the Sundholm patents, Morehouse and Kludt refer to grease guns. All of these devices, except Sundholm, U.S. Pat. No. 3,286,887, utilize an inwardly formed flange to guide the plunger assembly into the grease cartridge which represents an expensive machining operation. In commercial use of the device of Sundholm, U.S. Pat. No. 3,286,887, certain problems have arisen which have made it desirable to improve that device.

The plunger assembly of this invention represents important improvements in the art of multiloading grease guns. This plunger assembly is simple in construction, readily adjustable for use with cartridge-packed or bulk-loaded grease and does not require an inwardly formed flange on the grease barrel to guide it into the grease cartridge.

SUMMARY OF THE INVENTION

This invention relates to an improved plunger assembly for use with multiloading hand grease guns. The plunger assembly comprises a sleeve having a bore formed therethrough for slidable engagement with the longitudinal rod in hand grease guns. A transverse web is carried by the forward portion of the sleeve and extends radially outwardly of the sleeve and, at its periphery, is attached to an interior support section which extends rearwardly and outwardly to proximate the inner diameter of the grease barrel. An annular flexing and sealing wall is carried by the periphery of the interior support section and extends outwardly to slightly beyond the inner diameter of the grease barrel and then forwardly of the forward end of the sleeve and inwardly of the inner diameter of a grease cartridge adapted for insertion in the GREASE BARREL. An annular lip is formed on the inner side of the annular wall forwardly of the sleeve and engages washer means between the lip and the forward portion of the transverse web.

An object of this invention is to provide a plunger assembly for a grease gun, the grease gun being adapted for both cartridge-packed and bulk-filled grease.

Another object is to provide a plunger assembly as described which does not require that an inwardly formed flange be formed on the grease barrel.

A further object is to provide a plunger assembly as described which maintains sealing engagement with the inside of a grease barrel or the inside of a grease cartridge.

Still another object is to provide a plunger assembly which utilizes the hydraulic pressure developed in the grease barrel is sealing the plunger assembly and the grease barrel.

Yet a further object is to provide a plunger assembly which minimizes grease leakage through the bore of the sleeve into the rear of the grease gun.

DESCRIPTION OF THE PREFERRED EMBODIMENTS

Figure 1:
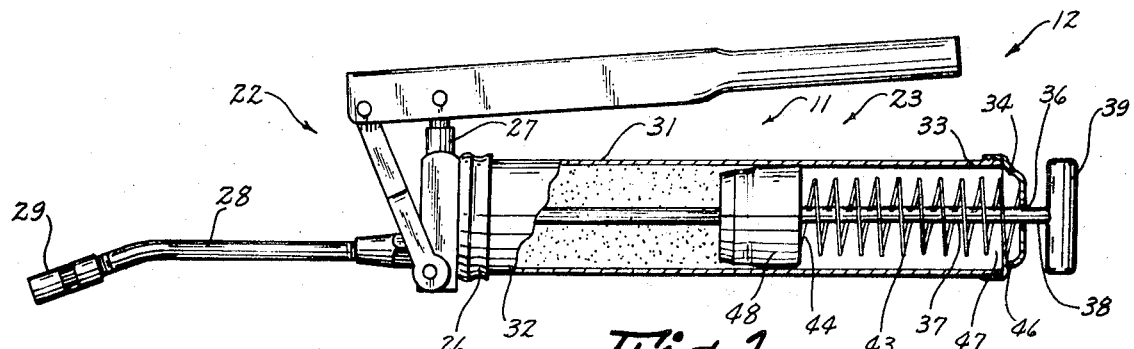
FIG. 1 is a side view of a bulk-loaded grease gun which is partially cut away to show a side view of the plunger assembly.
Figure 3:
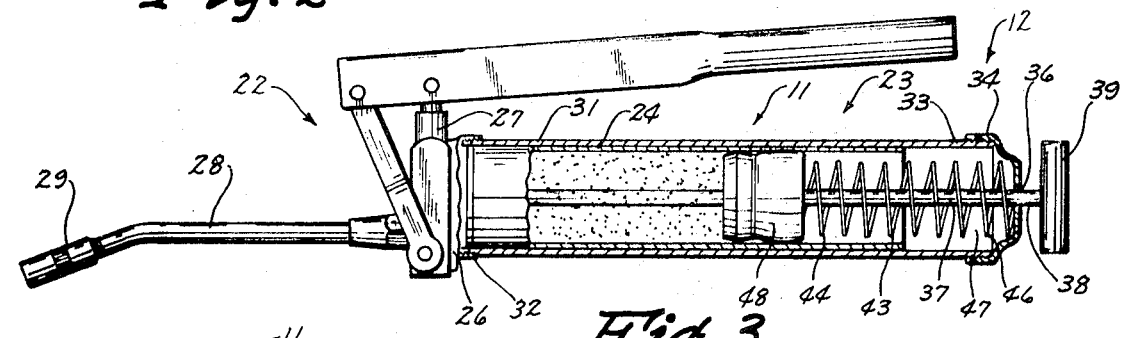
FIG. 3 is a side view of the grease gun of FIG. 1 containing cartridge-packed grease, the grease gun being partially cut away to show a side view of the plunger assembly.

Referring now to the drawings, the plunger assembly of this invention is indicated generally at 11 in FIGS. 1 and 3–7 and is illustrated in FIGS. 1 and 3 installed in a conventional hand grease gun 12. As shown best in FIG. 5, the plunger assembly 11 comprises a sleeve 13 having a bore 14 formed therethrough. A transverse web 16 extends radially of the sleeve 13 and, at its periphery, is attached to an interior support section 17. The interior support section 17 extends outwardly and rearwardly and, on its periphery, carries an annular flexing and sealing wall 18 which has an annular lip 19 formed on the forward portion thereof. A washer means 21 is secured between the forward portion of the transverse web 16 and the rearward portion of the annular lip 19.

Figure 2:
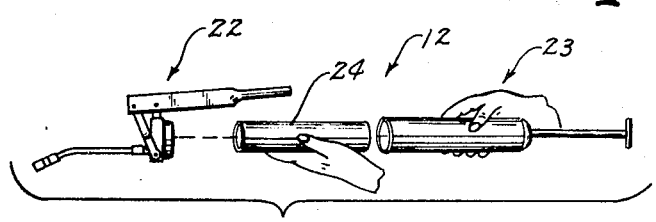
FIG. 2 is a reduced size, perspective view of the grease gun of FIG. 1 illustrating the insertion of a grease cartridge therein.

More specifically, the plunger assembly 11 is installed in a conventional hand grease gun 12 (FIGS. 1 – 3). The grease gun 12 comprises a dispensing head assembly 22, a barrel assembly 23, and a grease cartridge 24 (FIGS. 2 and 3). The head assembly 22 is substantially the same as that shown in Sundholm, U.S. Pat. No. 3,059,819 and includes an attachment cap 26, a lever actuated high pressure cylinder 27, an applicator pipe 28, and an outlet check valve 29. The head assembly 22 forms no part of the present invention and, therefore, no further description of it will be made herein.

This invention is concerned with the cooperation of the plunger assembly 11 with the barrel assembly 23 and the grease cartridge 24. The barrel assembly 23 (FIGS. 1-3) comprises an elongated cylindrical barrel 31 having a threaded forward end 32 and a threaded rearward end 33. The barrel 31 is adapted to receive bulk-filled grease by any of the before described techniques or the grease cartridge 24. A rear cap 34 is threadably secured to the rearward end 33 of the barrel 31 and has a central opening 36 formed therein. A plunger rod 37 extends through the central opening 36 and along the longitudinal axis of the barrel 31. The rearward end 38 of the rod 37 is provided with a handle 39 while the forward end 41 has at least two forwardly extending lugs 42 (FIG. 4) formed thereon. A coiled compression spring 43 encircles the rod 37 and, at its forward end 44, bears against the rear of the plunger assembly 11 and, at its rearward end 46, bears against the inside of the cap 34.

The grease gun 12 can be provided with a plunger rod latch (not shown) suitable for latching the rod 37 in withdrawn position as described in Sundholm, U.S. Pat. No. 3,414,170. When the rod 37 is withdrawn as shown in FIG. 2, the plunger assembly 11 is also withdrawn to the rearward portion 47 of the barrel 31. The rod 37 can then be latched to facilitate introduction of the grease cartridge 24. Alternatively, the method of loading a grease cartridge in a hand grease gun described in Sundholm, U.S. Pat. No. 3,341,084, can be employed.

As is best shown in FIGS. 4 – 7, the plunger, indicated generally at 48, is of integral, molded construction. The plunger 48 is formed from flexible, resilient, grease-resistant material such as synthetic rubber.

The plunger 48 (FIGS. 4 and 5) comprises a central sleeve 13, generally of cylindrical configuration, having a bore 14 formed therethrough for slidably receiving the rod 37. The sleeve 13 is sufficiently long to guide the plunger assembly 11 on the rod 37 in combination with the washer means 21. An annular sealing section 49 is preferably formed on the forward end 50 of the sleeve 13 to wipe the rod 37 as it slides through the sleeve 37. The rearward end 51 of the sleeve 13 projects into the center of coiled spring 43.

A transverse web 16 (FIG. 5) is carried by the forward portion 52 of the sleeve 13 and extends radially outwardly of the sleeve 13. To provide greater resiliency, an annular recess 53 can be formed in the transverse web 16 proximate the bore 14. The forward side 54 of the transverse web 16 bears against the washer means 21 while the rearward side 56 bears against the forward end 44 of the spring 43.

The forward side 54 of the web 16 (FIG. 5) extends radially outwardly and generally perpendicularly of the longitudinal axis of the barrel 31. The forward end 50 of the sleeve 13 is preferably in the same plane as the forward side 54 of the web 16. The rearward side 56 of the web 16 extends arcuately forwardly from about midway of the length of the sleeve 13 and outwardly of the sleeve 13.

The interior support section 17 (FIG. 5) is attached to the periphery 57 of the transverse web 16 and extends outwardly and rearwardly of the web 16 to proximate the inner diameter of the barrel 31. The interior support section 17, when viewed in cross section, is substantially planar and is formed at an angle of more than 60° with the plane of the forward side 54 of the web 16. The rearward portion 58 of the support section 17 extends rearwardly of the rearward end 51 of the sleeve 13.

Figure 4:
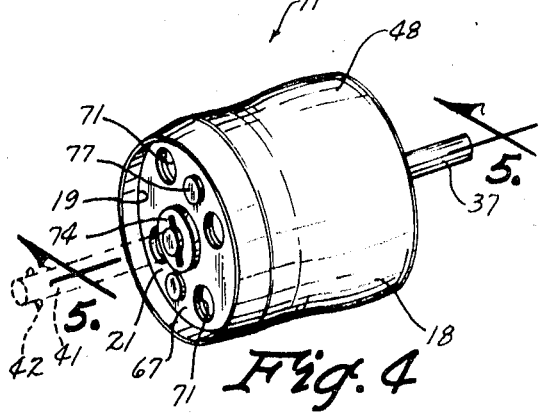
FIG. 4 is an enlarged perspective view of the plunger assembly of this invention.
Figure 5:
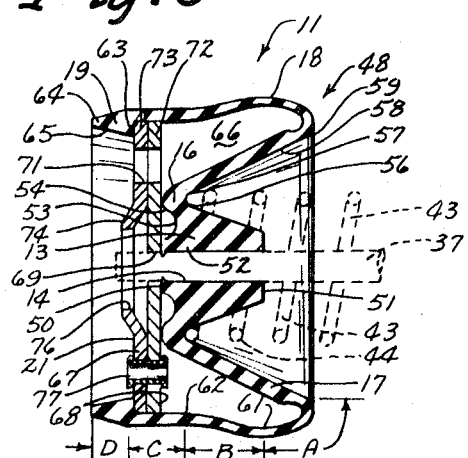
FIG. 5 is a cross-sectional view of the plunger assembly taken along line 5—5 of FIG. 4 with the longitudinal rod and the spring shown in phantom.
Figure 6:
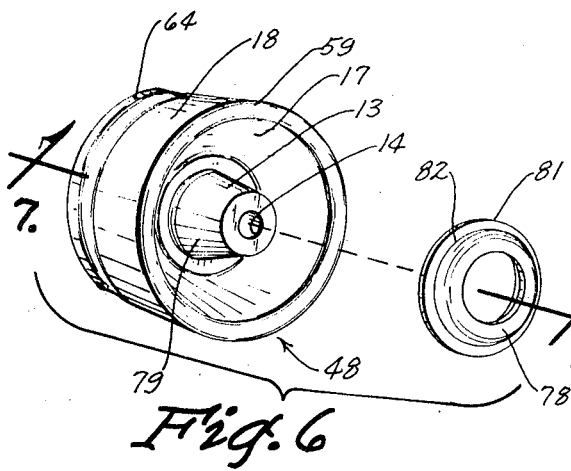
FIG. 6 is an exploded perspective view of the plunger having a rigid disc retainer juxtaposed of the outer portion of the sleeve.
Figure 7:
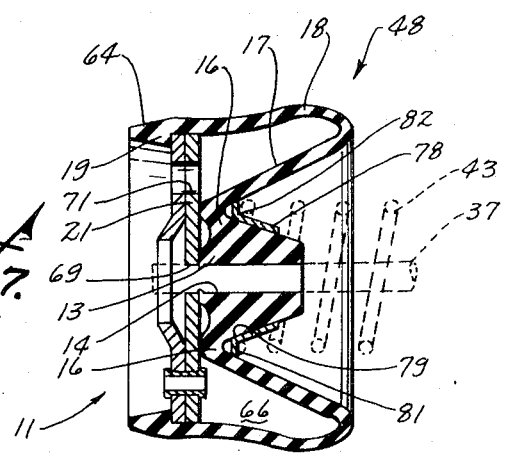
FIG. 7 is an enlarged, cross-sectional view of the plunger and disc retainer taken along line 7—7 of FIG. 6.

The periphery 59 of the support section 17 carries the annular flexing and sealing wall 18 (FIGS. 4 and 5). The annular wall 18, while formed integrally, can best be described in sections. As shown in FIG. 5, the wall 18 can be divided into four sections, A, B, C, and D, for descriptive purposes.

Section A extends outwardly of the periphery 59 of the support section 17 to slightly beyond the inner diameter of the barrel 31 and arcuately forwardly. Section A is relatively more flexible and resilient than the support section 17. Therefore, Section A is readily deformable to adjust to a range of diameters, i.e., the inner diameters of the grease barrel 31 and the grease cartridge 24. Sealing engagement is insured by the outward pressure exerted by the less flexible and resilient support section 17 and, as will be explained in more detail hereinafter, the hydraulic pressure developed in the grease. Section A extends forwardly to proximate the lateral plane formed across the rearward end 51 of the sleeve 13 as shown in FIG. 5.

Section B then extends forwardly and inwardly in an arcuate manner to proximate, generally slightly less than the inner diameter of a grease cartridge 24 adapted for insertion into the grease barrel 31. Section B extends to proximate the lateral plane of the forward end 50 of the sleeve 13. The wall thickness of section B may be tapered from the rearward end 61 to the forward end 62 to provide more flexibility in the plunger assembly.

Section C, in this preferred embodiment, extends forwardly from Section B to the annular lip 19. Section C, when viewed in cross section, is substantially parallel with the longitudinal axis of the barrel 31 and the wall thickness of section C is substantially the same as the forward end 62 of Section B.

Section D extends forwardly and inwardly in an oblique manner to the forwardmost portion 64 of the annular wall 18. Section D is considerably less flexible than Sections A, B, and C because the annular lip 19 is formed on the inner side 65 thereof. Section D is readily inserted in a grease cartridge 24 even if the cartridge 24 is slightly deformed. As the plunger assembly 11 is inserted in the cartridge 24, the cartridge 24 is straightened out by the washer means 21 and Sections B and A of the annular wall 18.

As can readily be seen from FIG. 5, an annular void 66 is formed between the annular wall 18 and the interior support section 17. Hydraulic pressure developed in the grease is transferred into this void 66 to enhance the sealing engagement of the plunger assembly 11 with the barrel 31 or the cartridge 24.

An annular lip 19 is formed on the inner side 65 of the annular wall 18 forwardly of the lateral plane formed by the forward end 50 of the sleeve 13 and the forward side 54 of the transverse web 16. The rearward portion 63 of the annular lip 19 engages the forward side 67 of the washer means 21 while the rearward side 68 of the washer means 21 is engaged by the forward side 54 of the transverse web 16.

The washer means 21 is of substantially circular configuration and has a diameter substantially equal to the inside diameter of the annular wall 18 rearward of the annular lip 19. The washer means 21 has a bore 69 formed therethrough aligned with the bore 14 in the sleeve 13 for slidably receiving the plunger rod 37. Additionally, at least one aperture 71 is formed through the washer means 21 outwardly of the transverse web 16. The apertures 71 allow grease to flow into the void 66 and thereby the sealing engagement of the plunger assembly 11 with the barrel 31 or the cartridge 24 is enhanced.

In a preferred embodiment the diameter of the washer means 21 is also substantially equal to the outside diameter of the annular wall 18 at the forwardmost portion 64 thereof. The forward thrust of the spring 43 is thereby distributed equally and forwardly on the annular lip 19.

It is also preferred that the washer means 21 comprise a rearward circular washer 72 and a forward circular washer 73. The forward circular washer 73 has a raised, forwardly extending portion 74 with notches 76 formed therethrough communicating with the bore 69. The notches 76 are alignable with the lugs 42 formed on the plunger rod 37. The rod 37 can thereby be affixed to the plunger assembly 11 for forwardly extending the plunger assembly 11. The washers 72 and 73 are superposed and affixed together by rivet means 77 or the like to form the washer means 21.

A disc retainer 78 (FIGS. 6–7) is juxtaposed around the forward, outer portion 79 of the sleeve 13 rearwardly of the transverse web 16. The disc retainer 78 is of generally frustoconical configuration and is designed to fit snugly around the sleeve 13. An annular spring support 81 extends outwardly of the forward edge 82 of the disc retainer 78 and supports the forward end of the spring 43.

The spring 43 holds the disc retainer 78 firmly in position against the outer portion 79 of the sleeve 13. The disc retainer 78 thereby prevents the sleeve 13 from flexing and prevents the concomitant leakage of grease through the bore 14 of the sleeve 13.

This plunger assembly 11 is constructed to adapt to a range of diameters without the utilization of an inwardly formed flange as described in the prior art. This plunger assembly 11 also utilizes the hydraulic pressure developed in the grease to facilitate sealing the plunger assembly 11 and the barrel 37 or grease cartridge 24.

The preferred embodiment of this invention has been described above but it is to be remembered that various modifications can be made without departing from the invention as defined in the appended claims.

I claim:

1. In a hand grease gun of the kind including a cylindrical grease barrel with a forward end and a rearward end, and a rod extending along the longitudinal axis thereof, the grease gun being adapted to use both cartridge-packed and bulk-filled greases, the improvement consisting of a plunger assembly; said plunger assembly comprising:

a. a sleeve having a forward end and a rearward end and having a bore formed therethrough for slidably receiving the rod;
b. a transverse web carried by the forward portion of said sleeve and extending radially outwardly of said sleeve;
c. an interior support section attached to the periphery of said transverse web and extending radially outwardly and rearwardly of said transverse web to proximate the inner diameter of the grease barrel;
d. an annular flexing and sealing wall carried by the periphery of said support section and extending outwardly thereof to slightly beyond the inner diameter of the grease barrel, said wall then extending forwardly of said forward end of said sleeve and inwardly of the inner diameter of a grease cartridge adapted for insertion in the grease barrel;
e. an annular lip formed on the inner side of said wall forwardly of the forward end of said sleeve;
f. washer means of circular configuration having a diameter substantially equal to the inside diameter of the annular wall rearward of said annular lip engaged on the forward side thereof by the rearward portion of said annular lip and on the rearward side thereof by the forward side of said transverse web, said washer means having a bore aligned with said bore in said sleeve formed therethrough for slidably receiving the rod.

2. The plunger assembly of claim 1 wherein said sleeve, said transverse web, said support section, said annular wall, and said annular lip are of integral molded construction and are formed from resilient material.

3. The plunger assembly of claim 2 wherein said annular wall is relatively more flexible and resilient than said support section and said annular lip.

4. The plunger assembly of claim 3 wherein said annular flexing and sealing wall extends arcuately forwardly and outwardly of said support section to slightly beyond the inner diameter of the grease barrel and then arcuately forwardly and inwardly to proximate the inner diameter of a grease cartridge adapted for insertion in the grease barrel proximate the lateral plane of the forward end of said sleeve; said wall then extends forwardly to said rearward portion of said annular lip and then obliquely forwardly and inwardly to the forwardmost portion of said annular wall.

5. The plunger assembly of claim 4, wherein said support section extends rearwardly of said rearward end of said sleeve and wherein an annular void is provided between said support section and said annular wall.

6. The plunger assembly of claim 5 wherein the diameter of said washer means is substantially equal to the outside diameter of the annular wall at the forwardmost portion thereof.

7. The plunger assembly of claim 6 wherein a retainer engages the forward, outer portion of said sleeve rearwardly of said transverse web.

8. The plunger assembly of claim 7, wherein the retainer is of frusto-conical configuration.

9. The plunger assembly of claim 8, wherein an annular spring support extends outwardly of the forward edge of said retainer.

10. The plunger assembly of claim 9, wherein said washer means comprises:
   a rearward circular washer;
   a forward circular washer having a raised central portion and having notches formed through said central portion communicating with said bore;
   said washers being superposed and affixed together with said raised central portion extending forwardly.

11. The plunger assembly of claim 5, wherein at least one aperture is formed through said washer means radially outwardly of said transverse web such that grease can pass through said aperture into said annular void.

* * * * *